United States Patent [19]

Emmert

[11] Patent Number: 4,700,537
[45] Date of Patent: Oct. 20, 1987

[54] CROP DIVIDER MOUNTING ARRANGEMENT FOR A HARVESTER

[75] Inventor: Walter Emmert, Contwig, Fed. Rep. of Germany

[73] Assignee: Deere & Company, Moline, Ill.

[21] Appl. No.: 906,349

[22] Filed: Sep. 10, 1986

[30] Foreign Application Priority Data

Sep. 14, 1985 [DE] Fed. Rep. of Germany ..... 85111634

[51] Int. Cl.$^4$ ............................................. A01D 63/00
[52] U.S. Cl. ......................................... 56/314; 56/119
[58] Field of Search ................. 56/312, 314, 119, 320, 56/313

[56] References Cited

U.S. PATENT DOCUMENTS

| 2,707,365 | 5/1955 | Dreher | 56/312 |
| 2,892,298 | 6/1959 | Chaney | 56/314 |
| 3,380,233 | 4/1968 | Fergason | 56/119 |
| 3,885,377 | 5/1975 | Jones | 56/314 |
| 3,967,439 | 7/1976 | Mott | 56/314 |
| 4,490,967 | 1/1985 | Mills | 56/119 |
| 4,493,181 | 1/1985 | Glendenning et al. | 56/119 |

OTHER PUBLICATIONS

Operator's Manual for John Deere 955 Combine, OM-Z 91108, Ausgabe F5, pp. 59-61.

Primary Examiner—Paul J. Hirsch

[57] ABSTRACT

A crop divider of the cutting platform of a self-propelled combine harvester is loosely supported for floating and rocking movement in a vertical fore-and-aft plane, by a rearwardly extending frame member or spine of the divider being inserted into and extending through a pair of vertically slotted brackets, spaced fore-and-aft. The pivot point for the divider is thus undefined and may move back and forth between the front and rear brackets according to the operating height of the cutting platform.

18 Claims, 3 Drawing Figures

CROP DIVIDER MOUNTING ARRANGEMENT FOR A HARVESTER

BACKGROUND OF THE INVENTION

The invention concerns a crop divider, provided at a lateral end of a transversely extending harvesting header or gatherer for dividing the crop to be gathered from the standing crop, and more particularly, a means of mounting such a divider.

Crop dividers are well known and are used on a variety of harvesting machines. They are frequently used, for example, on cutterbar type harvesting platforms, the pointed ends of the dividers extending forwardly of the opposite ends of the cutterbar. Typically, dividers are pivotably mounted so that they are free to swing in a vertical arc in a fore-and-aft plane about a fixed single pivot point, to follow the contour of the ground. Some dividers are partially counter-balanced, for example, by springs.

In typical operation, with the harvester gatherer or platform at operating height above the ground, the divider rides on the ground to guide or divide the crop into the gatherer, pivoting up and down to follow variations in the ground surface. Typically, the operating height of the harvester gatherer or platform is vertically adjustable, the operator setting the height according to crop or harvesting conditions. The angle of inclination of the divider in a fore-and-aft plane when operating in contact with the ground will, of course, vary and depend entirely on the operating height of the platform. When the crop divider is carried on a simple single pivot, the range of divider angle of inclination or attitude thus defined, may significantly exceed an optimum range for efficient operation of the divider or divider point in dividing and lifting crop.

SUMMARY OF THE INVENTION

Accordingly, it is an object of the invention to provide a mounting or support arrangement for a harvester crop divider so that it moves, in its working range, in a modified manner compared with the conventional simply pivoted crop divider. A more specific object of the invention is to provide a divider mounting arangement in which the divider effective pivot point and in which the change of angle of inclination of the divider point, for a given change in operating height of the platform, varies according to the operating height of the platform above the ground.

According to the invention, the crop divider is loosely supported in a generally fore-and-aft extending guide carried by the frame of the harvester platform or gatherer. An elongated fore-and-aft extending frame member or spine of the crop divider extends rearwardly through the guide. The form of the guide prevents rotation of the crop divider about its fore-and-aft axis, but permits pivoting and translational movement in an upright fore-and-aft plane. The pivot point of the divider with respect to the gatherer or platform frame may be said to be undefined, but engagement of the divider frame member or spine with the guide, in operation, establishes at least a pair of effective pivot points as the divider moves through its operating range. Movement of the crop divider frame member or spine within the guide is unrestricted, except for the provision of a stop arrangement, effective between the spine and the guide, for maintaining an approximately constant fore-and-aft disposition of the crop divider with respect to the guide.

In a preferred embodiment of the invention, the harvester gatherer or platform frame includes at each of its opposite ends a pair of vertical slots, spaced apart fore-and-aft, with the front slot rearward of the divider center of gravity. The slots are disposed and the spine is formed, so that the harvester platform elevated to a transport position, the crop divider point hangs down under the action of gravity with the spine "stopped" by the bottom of the front slot and the top of the rear slot. As the platform is lowered towards operating height, the crop divider point engages the ground and the spine effectively pivots about the bottom of the forward slot. As the platform is lowered further, the spine rocks back in the guide, eventually lifting from the bottom of the forward slot and engaging the bottom of the rearward slot, which thus becomes the effective pivot point. Upward movement of the divider point with respect to the platform frame is finally limited by the spine engaging the top of the front slot and the bottom of the rear slot.

Crop divider operating characteristics deriving from a divider mounting arrangement according to the invention are generally suitable for all operating conditions and include some significant and useful differences from those of conventional dividers. For example, upon first contact of the divider point with the ground, as the platform is lowered towards operating height, the effective pivot point of the divider is relatively forward so that the unbalanced weight of the divider is relatively low. Thus, ground pressure is also relatively low so that the divider point readily pivots upwards as lowering of the platform continues, or as ground surface conditions require. Friction between the divider point and the ground is relatively low and the reduced ground pressure reduces the possibility of the point digging in in soft conditions.

The relatively forward position of the divider effective pivot point, effective in the upper ranges of operating height, results in a desirable relatively rapid change in angle of inclination of the divider point for a given change in operating height, so that the divider point is rapidly rotated towards its optimum operating attitude as the platform is lowered.

In the lower ranges of operating height, used, for example, in down grain crops or soybeans, the rearward pivot is in effect. The greater radius arm from divider point to pivot means that the point can ride up with relatively less change in attitude or angularity, so that the point can continue to get under and lift down crop—the forward working tip of the divider point is kept close to the ground.

When an extra long divider is used, again as, for example, in harvesting soybeans or down or tangled crop, the possibility of translational movement of the spine within the guide becomes useful. If a ground-engaging surface or skid shoe on the bottom of the divider point is of significant length, the divider point may ride flat on the ground and rise up and down relative to the platform frame without substantial change in angularity or attitude. The "looseness" of the spine within the guide permits this mode of operation—equivalent to an effective pivot point at an infinite distance to the rear of the divider point. At low platform operating heights, with the divider point relatively flat on the ground, the effective rearward pivot point provided by the engagement of the spine with the rear slot, or the infinitely rearward effective pivot point of the floating mode, result in relatively greater pressure between the point and the ground, helping the point to hug the ground and get under the crop. In the flat attitude, there is less risk of the divider point digging into the ground.

It is a further advantage of a divider arrangement according to the present invention, that for a given length of divider assembly, including particularly the length of the divider elongated frame or spine member, the simple structure of fore-and-aft apertures with opportunity for vertical movement in both, provides a greater total range of floating adjustment for the divider point than a conventional pivoted divider having a similar range-limiting front bracket or aperture but only a simple single fixed pivot rearward of that aperture. The potential for rearward disposition of the effective pivot point gives a divider mounting according to the invention some of the advantages and operating characteristics of a simply pivoted long divider but using a shorter, inherently more stable structure.

In the invention, a simple structure provides not only a desirable floating range, but the mounting arrangement itself automatically provides stable support in transport, and there is no need for special stops or brackets. A further advantage of the invention is that, with adequate fore-and-aft spacing between the front and rear apertures or brackets, lateral stability of the divider is maintained without the need for additional stablizing structure.

DESCRIPTION OF THE PREFERRED EMBODIMENT

Figure 1:
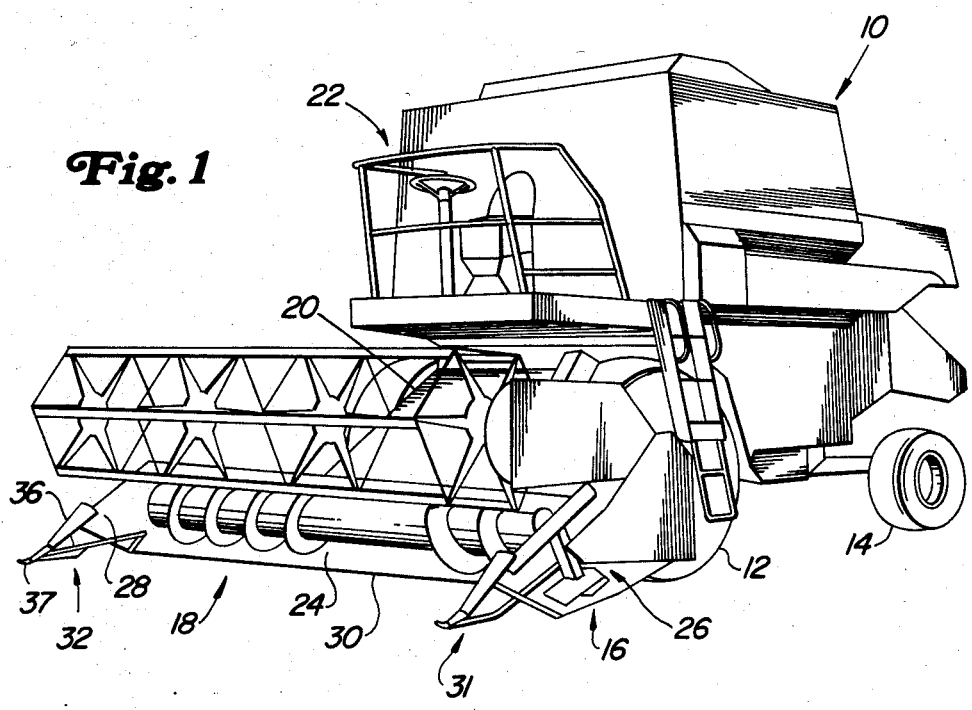
FIG. 1 is a left front perspective view of a self-propelled combine harvester equipped with a cutting platform and having a pair of crop dividers according to the invention.

The invention is embodied in a self-propelled combine harvester 10, shown in FIG. 1. Apart from the invention, the harvester is generally conventional. It is propelled by powered front wheels 12 and steered by rear wheels 14. The forward mounted vertically adjustable header 16 carries a front mounted gatherer or harvesting device, in this case a cutting platform 18, feeding gathered material to a feeder house 20 for transmission to the body of the harvester for processing. The harvester is controlled from an operator's station 22.

Figure 2:
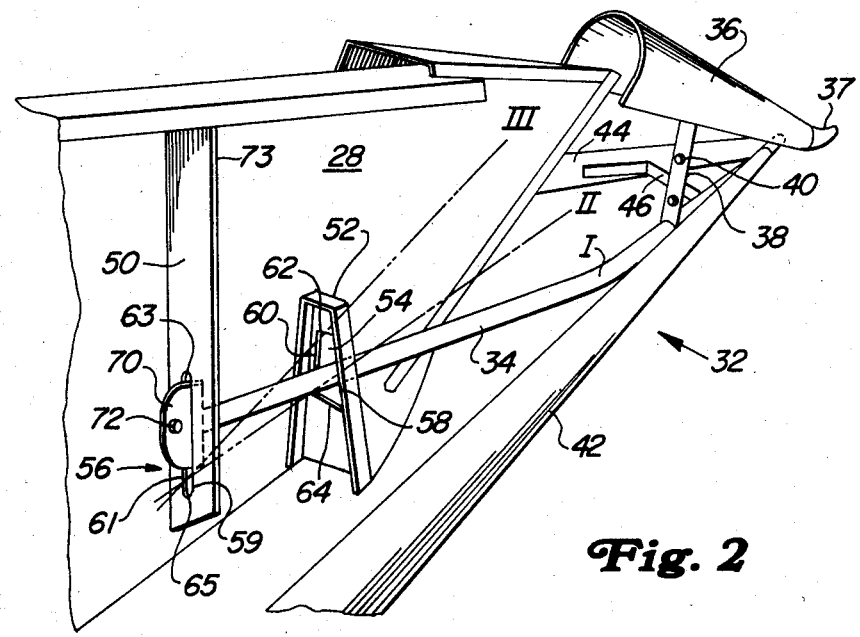
FIG. 2 is an enlarged partial rear three-quarter perspective view of the outer side of the right-hand crop divider of the combine of FIG. 1.

The cutting platform 18 has a material transfer floor or bottom 24, bordered by opposite fore-and-aft extending side walls, left- and right-hand, 26, 28, respectively, behind a conventional cutterbar 30. Crop dividers 31 and 32, left- and right-hand, respectively, extend forward from the side walls 26, 28, for dividing the crop and guiding a swath into engagement by the cutterbar 30. The dividers 31, 32, are generallly indentical but of opposite hand and only the right-hand divider 32, shown in FIG. 2, will be described in any detail.

The divider 32 includes a fore-and-aft extending main frame member or spine 34, in this case of tubular construction, carrying a frusto-conical divider point 36, having a divider point nose or shoe 37. Attachment of the point 36 to the spine 34 is reinforced and made adjustable by adjustable brace 38, including suitable hardware 40. The dividing and deflecting function of the divider point 36 is extended by outer and inner elongated deflectors 42, 44, respectively. Deflector 42 is tied directly to the spine frame member 34, while the inner deflector 42 is braced by a strut 46.

Spaced fore-and-aft, on the outside of the right-hand platform side wall 28, are a pair of guide brackets rear and front, 50, 52, respectively. The brackets each have generally vertically extending slots 54, 56, in the front and rear brackets respectively. The slots have opposite outer and inner upright edges, 58, 59 and 60, 61, respectively. Top and bottom portions of the slots are, front and rear respectively, top 62, 63 and bottom 64, 65. Preferably the slotted brackets 50, 52 are positioned so that the center of gravity of the divider 32 is forward of the front bracket 52.

A stabilizing flange 70 abuts and is rigidly attached to the end of the spine tube 34. In assembly, the flange 70 is inserted in the rear slot 56, and insertion of locking element or retaining pin 72 secures the divider 32 against fore-and-aft movement, but permits the flange 70 to slide up and down in the rear slot 56, with the butt end of the spine tube 34 adjacent the forward face 73 of the rear bracket 50. The fit of the flange 70 in the slot 56 and its vertical extent prevent the divider 32 from rotating about its fore-and-aft axis. Preferably, the fit of the spine 34 in the front slot 54 and of the flange 70 in the rear slot 56 are such as to provide lateral stability for the divider 32. But, it desired, this function could be provided or assisted by additional guide surfaces (not shown) independent of the slots 54, 56.

In operation, the handling of the combine harvester 10 is generally conventional. In transport the header 16 is usually fully elevated (not shown in the drawings), so that the divider 32 is clear of the ground and hangs in a "ready" position with the spine 34 resting on the bottom 64 of the front slot 54, and the flange 70 abutting the upper end 63 of the rear slot 56. The bottom 64 of the front slot 54 is inclined to form a vee with the upright outer edge 58. This cradles the spine 34 and reduces rattling of the divider during transport on rough terrain.

Figure 3:
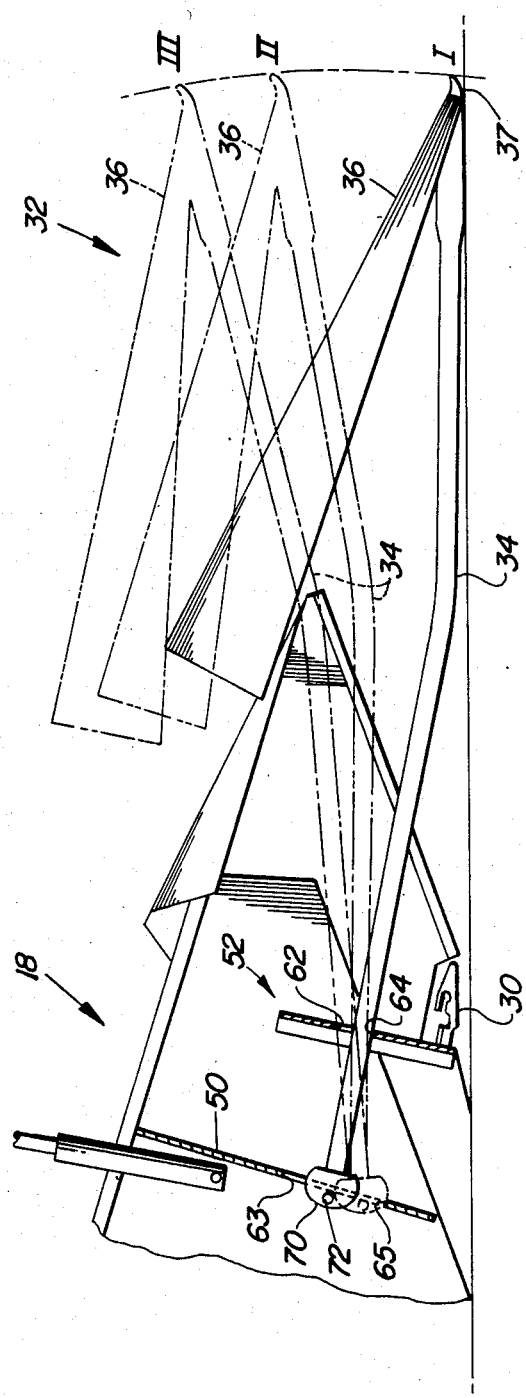
FIG. 3 is a semi-schematic elevation of a crop divider, according to the invention, with the divider point shown in a range of working positions.

As the header is lowered into operating position (similar to the position shown in FIG. 1), the shoe 37 of the divider point 36 contacts the ground and the point 36 moves upwards relative to the platform 18 to a first operating position indicated by numeral I in FIG. 3. Here the flange 70 has come away from its upper stop 63, and the spine 34 is pivoting on the lower edge 64 of the front slot. Especially if the front bracket 52 is relatively far ahead, the weight of the divider 32 will be distributed so that a significant portion of the weight of the divider is borne by the front bracket 52, thus reducing the ground pressure of the divider point 36, so that it may respond more readily to changes in field surface levels.

As the cutting platform 18 is lowered still further, or as the divider rides up due to surface variations, the divider 32 may assume a position indicated at numeral II in FIG. 3, where the spine 34 is lifted from the bottom 64 of the front slot and is effectively pivoting, by means of flange 70, about the bottom end 65 of the rear slot. Ground pressure of the divider is thus relatively increased because of the rearward movement of the effective pivot point of the divider. Thus, during movement of the crop divider 32, from position I into position II, the effective pivot point travels or transfers from the front barcket 52 to the rear bracket 50. Momentarily, the pivot point for the divider is undefined and, at least in part of the range of operating height, because of the depth of the slots 54, 56, the divider is free to float in a translational mode as well as pivoting, with or without contact at the bottoms 64, 65 of the slots. Thus the advantages of a range of pivot or support arrangements is obtained with a simple, compact structure.

The displacement of the crop divider 32 between the positions I and II of FIG. 3 corresponds to a typical operating range. An upward limiting position is illustrated at numeral III of FIG. 3. The spine 34 is prevented from further upward movement by having come into contact with the top 62 of the front slot and the bottom 65 of the rear slot.

The free floating divider support arrangement of the invention has been illustrated in a self-propelled combine harvester application. But, of course, it may be used in other applications, such as the dividers of other harvesting machines, or even in such devices as a planter furrow marker, or in any application where it is useful for the ground pressure and pivoting characteristic of the ground-engaging portion of a device to be variable, at least in part, according to the operating position of the device relative to the frame which carries it.

I claim:

1. In a harvesting machine having a forwardly disposed transversely extending crop gatherer movable between a lower operating position and an upper transport position, and including a frame with opposite ends and a forwardly extending crop divider carried by at least one of the frame opposite ends, the divider riding on the ground when the gatherer is in the operating position and having a frame including an elongated generally fore-and-aft extending spine having a fore-and-aft axis and carrying a forwardly extending generally conical divider point for dividing crop to be gathered from adjacent crop, a divider support arrangement for the divider comprising:

a fore-and-aft extending guide carried by the frame adjacent the at least one opposite end for receiving the spine and defined, at least in part, by spaced apart forward and rearward apertures, the divider being disposed so that the spine passes through the apertures and the apertures being sized so that, responsive to external forces on the divider point, the spine may move in the guide in translational, rocking or pivoting motion in a fore-and-aft upright plane.

2. The divider support arrangement of claim 1 wherein each aperture includes a pair of opposite upright sides for engaging the spine and cooperating to limit the movement of the spine to the generally fore-and-aft upright plane.

3. The divider support arrangement of claim 1 wherein each aperture has opposite upper and lower limiting surfaces for engaging the spine to limit its movements in the fore-and-aft upright plane.

4. The divider support arangement of claim 1 and further including stop means effective between the spine and the guide for limiting fore-and-aft movement of the spine relative to the guide.

5. The divider support arrangement of claim 1 wherein the guide includes spaced apart forward and rearward guide members, each guide member including a vertical slot having opposite upright sides and a bottom and a top, the slots being substantially in fore-and-aft alignment.

6. The divider support arrangement of claim 5 and further including a normally vertically extending stabilizer rigidly attached to the spine, and disposed to engage at least one of the slot upright sides of one of the guide members so as to prevent rotation of the spine about its fore-and-aft axis while permitting vertical sliding in the slot.

7. The divider support arrangement of claim 6, and further including stop means associated with the stabilizer for engaging at least one of the guide members for limiting fore-and-aft movement of the spine relative to the guide member.

8. The divider support arrangement of claim 7 wherein the spine is tubular and has a rearward end, said end carrying the stabilizer in abutting relationship and wherein, in assembly, the rearward end of the spine abuts the rearward guide member.

9. The divider support arrangement of claim 6 wherein the stabilizer engages the rearward guide member.

10. The divider support arrangement of claim 5 wherein the bottom of the slot of the forward guide member is inclined with respect to at least one of the opposite upright sides of the slot so as to define a cradle for closely receiving and holding the spine so that when the gatherer is in the upper transport position and the spine is engaging the bottom of the slot, the divider is laterally restrained.

11. The divider support arrangement of claim 5 wherein the guide members are so disposed and the spine is so formed that, as the divider point is displaced upwards in operation, the spine pivots first about the bottom of the slot of the forward guide member, and, progressively, the bottom of the slot of the rearward guide member, and wherein the upper limit of movement of the divider is defined by engagement of the spine simultaneously with the top of the slot of the forward guide member, and the bottom of the slot of the rearward guide member.

12. The divdier support arangement of claim 1 wherein the fore-and-aft spacing of the apertures is substantially less than the length of the spine.

13. The divider support arrangement of claim 1 wherein movement of the divider point in the fore-and-aft upright plane is limited only by engagement of the spine with the guide.

14. In a harvesting machine having a forwardly disposed transversely extending crop gatherer movable between a lower operating position and an upper transport position, and including a frame with opposite ends and a forwardly extending crop divider carried by at least one of the frame opposite ends, the divider riding on the ground when the gatherer is in the operating position and having a frame including an elongated generally fore-and-aft extending spine having a fore-and-aft axis and carrying a forwardly extending generally conical divider point for dividing crop to be gathered from adjacent crop, the divider being supported by the frame in a mounting for pivoting about an effective pivot point in a fore-and-aft upright plane between a lower and a higher position relative to the frame, the mounting being characterized in that, as the divider moves from the lower to the higher position, the effective pivot point is displaced in a fore-and-aft direction.

15. The mounting of claim 14 further characterized in that as the divider moves from the lower to the higher position, the displacement of the effective pivot point is rearwards.

16. The mounting claims 14 further characterized in that the mounting includes spaced apart front and rear elements engageable by the spine, and in that in the lower position of the divider the spine pivotably engages the forward element, and in the upper position of the divider the spine pivotably engages the rearward element.

17. The mounting of claim 16 further characterized in that the front and rear elements each include a stop for engaging the spine so that pivoting movements upwards about the rear element, and downwards about the front element respectively are limited.

18. The mounting of claim 16 further characterized in that it also includes means for maintaining the divider in approximately constant fore-and-aft relationship with the mounting.

* * * * *